United States Patent
Bae

(10) Patent No.: US 9,083,949 B2
(45) Date of Patent: Jul. 14, 2015

(54) HIGH SPEED SCALABLE VIDEO CODING DEVICE AND METHOD USING MULTI-TRACK VIDEO

(75) Inventor: Tae Meon Bae, Seoul (KR)

(73) Assignee: SK PLANET CO., LTD., Seoul (KR)

( * ) Notice: Subject to any disclaimer, the term of this patent is extended or adjusted under 35 U.S.C. 154(b) by 0 days.

(21) Appl. No.: 14/111,834

(22) PCT Filed: Apr. 16, 2012

(86) PCT No.: PCT/KR2012/002861
§ 371 (c)(1),
(2), (4) Date: Oct. 25, 2013

(87) PCT Pub. No.: WO2012/141551
PCT Pub. Date: Oct. 18, 2012

(65) Prior Publication Data
US 2014/0226723 A1     Aug. 14, 2014

(30) Foreign Application Priority Data

Apr. 15, 2011 (KR) .................. 10-2011-0035110
May 20, 2011 (KR) .................. 10-2011-0047638

(51) Int. Cl.
H04N 7/12     (2006.01)
H04N 7/26     (2006.01)
(Continued)

(52) U.S. Cl.
CPC ......... *H04N 19/0043* (2013.01); *H04N 19/107* (2014.11); *H04N 19/30* (2014.11);
(Continued)

(58) Field of Classification Search
CPC ............ H04N 7/12; H04N 7/26; H04N 19/00
See application file for complete search history.

(56) References Cited

U.S. PATENT DOCUMENTS

2005/0195899 A1     9/2005  Han
2009/0262803 A1*   10/2009  Wang et al. .............. 375/240.12
(Continued)

FOREIGN PATENT DOCUMENTS

CN        001774930 A      5/2006
CN        101529911 A      9/2009
(Continued)

OTHER PUBLICATIONS

International Search Report mailed Nov. 27, 2012 for PCT/KR2012/002861, citing the above reference(s).
(Continued)

*Primary Examiner* — Anner Holder
*Assistant Examiner* — Maryam Nasri
(74) *Attorney, Agent, or Firm* — Lowe Hauptman & Ham

(57) ABSTRACT

The present invention relates to a high speed scalable video coding device and method using a multi-track video, and the scalable video encoding device comprises: a video array unit for arraying a multi-track video in a plurality of layers according to a set standard; a bit stream analyzing unit for analyzing each layer of a bit stream and extracting encoding information including an encoding mode and prediction information; a layer for carrying out scalable video encoding; and a scalable video coding (SVC) encoding unit for determining the encoding mode using the encoding information of an upper or a lower layer of a layer carrying out the scalable video encoding, and for encoding in the determined encoding mode. The scalable video encoding device and method of the present invention enhance the speed of encoding a multi-track video into a scalable video by using the encoding information of a standard multi-track video.

13 Claims, 8 Drawing Sheets

(51) Int. Cl.

| | | |
|---|---|---|
| *H04N 19/00* | (2014.01) | |
| *H04N 19/31* | (2014.01) | |
| *H04N 19/51* | (2014.01) | |
| *H04N 19/30* | (2014.01) | |
| *H04N 19/61* | (2014.01) | |
| *H04N 19/107* | (2014.01) | |
| *H04N 19/42* | (2014.01) | |
| *H04N 19/40* | (2014.01) | |

(52) U.S. Cl.
CPC .............. *H04N 19/31* (2014.11); *H04N 19/40* (2014.11); *H04N 19/42* (2014.11); *H04N 19/51* (2014.11); *H04N 19/61* (2014.11)

(56) References Cited

U.S. PATENT DOCUMENTS

| | | |
|---|---|---|
| 2009/0268816 A1 | 10/2009 | Pandit et al. |
| 2010/0067580 A1 | 3/2010 | Sachdeva et al. |
| 2010/0232521 A1 | 9/2010 | Hagendorf et al. |

FOREIGN PATENT DOCUMENTS

| | | |
|---|---|---|
| EP | 2514208 A1 | 10/2012 |
| KR | 1020070039944 A | 4/2007 |
| KR | 1020090112485 A | 10/2009 |
| KR | 1020090113506 A | 11/2009 |
| KR | 1020100072722 A | 1/2010 |
| KR | 1020100072722 A | 7/2010 |
| WO | 2007115133 A2 | 10/2007 |
| WO | 2010102650 A1 | 9/2010 |

OTHER PUBLICATIONS

Chinese Office Action for application No. 201280024116.8 dated Jun. 5, 2014, citing the above reference(s).
Rosario Garrido-Cantos et al., "An Approach for an AVC to SVC Transcoder with Temporal Scalability", Jun. 23, 2010, pp. 225-232.
Jan De Cock et al., "Architectures for Fast Transcoding of H.264/AVC to Quality-Scalable SVC Streams", IEEE Transactions on Multimedia, Nov. 1, 2009, pp. 1209-1224, vol. 11, No. 7.
European Search Report for application No. 12771035.8 dated Aug. 1, 2014, citing the above reference(s).

* cited by examiner

HIGH SPEED SCALABLE VIDEO CODING DEVICE AND METHOD USING MULTI-TRACK VIDEO

CROSS-REFERENCE TO RELATED APPLICATIONS

The present application is a U.S. National Phase Entry of International Patent Application No. PCT/KR2012/002861, filed on Apr. 16, 2012, which is based upon and claims the benefit of priority to Korean Patent Application No. 10-2011-0035110, filed on Apr. 15, 2011 and Korean Patent Application No. 10-2011-0047638, filed on May 20, 2011. The disclosures of the above-listed applications are hereby incorporated by reference herein in their entirety.

TECHNICAL FIELD

The present invention relates to a high-speed scalable video coding device and method using a multi-track video, and more particularly, to a high-speed scalable video coding device and method using a multi-track video, for encoding a macroblock at high speed in an intra prediction or motion prediction mode using encoding information about a multi-track video.

BACKGROUND ART

In order to serve a user terminal with content including video and audio supplied by a Content Provider (CP), basic ingesting processes, such as resolution scaling, frame rate conversion, video/audio encoding, metadata insertion, and packaging, are performed on the content.

Here, if a content server serves the user terminal with a video having an error occurred when performing the ingesting processes, a problem occurs when the video is played back in the user terminal. In order to prevent such a problem, a process of playing back the final results and directly checking, by a person, the played results is performed.

Most of videos provided from a content server to a user terminal are many or massive in number. Thus, there has recently been proposed a technique for more quickly performing processes checked by a person by automating the processes because the processes checked by a person one by one for ingesting are taken a long time or limited.

In line with the technique, in on-line video service, a video is streamed through the Internet so that a user can consume the video. Here, a technique for preventing a user from viewing an interrupted video or a video including a broken image is generalized through adaptive video streaming technology in which the amount of video data is controlled according to a network environment of a user and transmitted. In current adaptive video streaming technology, in general, compression videos having various data sizes corresponding to one original video are prepared, and a compression video suitable for a network environment of a user is selected. In such a method, a service system needs to ingest a multi-track video that is several compression videos for one video.

Meanwhile, in order to recently provide video service to various devices and network environments through one compression video, a Scalable Video Coding (SVC) method has been standardized by Join Video Technology (JVT) group of ITU and MPEG based on H.264.

However, the SVC method has recently been standardized and is in the early stage in commercialization, and a multi-track video method for preparing several files for a video using an existing coding method, such as H.264, as a step prior to the SVC method and providing a file suitable for each device and network environment is now utilized. In the case of conversion into SVC in the future, an existing multi-track video needs to be encoded into SVC again. Such re-encoding is problematic in that a lot of time is taken.

DISCLOSURE

Technical Problem

The present invention has been contrived to solve the aforementioned problems, and an object of the present invention is to provide a high-speed scalable video coding device and method using a multi-track video for encoding a macroblock at high speed in an inter-layer intra prediction mode or an inter-layer/intra layer motion prediction mode using an encoding mode of a multi-track video, that is, compression videos compressed in various formats, and encoding information including prediction information.

Technical Solution

In accordance with an aspect of the present invention for achieving the aforementioned object, a scalable video encoding device includes a video array unit for arraying a multi-track video in a plurality of layers according to a set reference, a bit stream analysis unit for extracting encoding information, including an encoding mode and prediction information, by analyzing a bit stream of each of the layers, and an SVC encoding unit for determining an encoding mode using encoding information about a layer on which scalable video encoding is performed and an upper or lower layer of the layer on which scalable video encoding is performed and performing encoding in the determined encoding mode.

Here, the set reference may be defined as order of picture quality determined using an objective picture quality evaluation method, and the video array unit may array the multi-track video in the plurality of layers such that a high-picture quality video is disposed in an upper layer according to the order of picture quality.

Furthermore, the video array unit may array the multi-track video in the plurality of layers such that a video having higher resolution is disposed in a higher level, array the multi-track video in the plurality of layers such that a video having a higher frame rate is disposed in a higher level if two or more videos having identical resolution are present, and array the multi-track video in the plurality of layers such that a video having a higher bit rate is disposed in a higher level if two or more videos having identical resolution and frame rate are present.

Furthermore, the SVC encoding unit may encode each layer of the multi-track video by the macroblock and sequentially perform scalable video encoding on the plurality of layers from the lowest layer to the highest layer or from the highest layer to the lowest layer.

Furthermore, the SVC encoding unit may perform inter-layer intra prediction by up-scaling decoded texture information about a macroblock of the layer on which scalable video encoding is performed and decoded texture information about a macroblock of an upper layer corresponding to the macroblock, calculate an encoding cost of an inter-layer intra mode, calculate an encoding cost of an encoding mode of the layer on which scalable video encoding is performed, compare the calculated encoding costs with each other, perform encoding in the inter-layer intra mode if the encoding cost of the inter-layer intra mode is smaller than the encoding cost of the encoding mode of the layer on which scalable video encoding is performed, and perform encoding in the encoding mode of the layer on which scalable video encoding is performed if the encoding cost of the inter-layer intra mode is greater than or equal to the encoding cost of the encoding mode of the layer on which scalable video encoding is performed.

Furthermore, the bit stream analysis unit may extract the prediction information, including macroblock partition information and motion vector information, through video bit stream decoding for neighboring layers of the plurality of layers.

Furthermore, the SVC encoding unit may encode each layer of the multi-track video by the macroblock and encode the macroblock in an inter-layer motion prediction mode, an intra mode, or an encoding mode of the layer on which scalable video encoding is performed using macroblock partition information and motion vector information.

Furthermore, the SVC encoding unit may determine the inter-layer motion prediction mode, the intra mode, or the encoding mode of the layer on which scalable video encoding is performed to be an encoding mode of the macroblock by sequentially determining a first process of determining whether or not the macroblock of the layer on which scalable video encoding is performed is a motion prediction mode, a second process of determining whether or not a macroblock of a lower layer of the macroblock is a motion prediction mode, a third process of determining whether or not macroblock partition information about a macroblock of the lower layer that has been up-scaled is identical with macroblock partition information about the macroblock, and a fourth process of determining whether or not a motion vector of the macroblock of the lower layer is identical with a motion vector of the macroblock.

In accordance with another aspect of the present invention, a scalable video encoding method includes steps of (a) arraying, by a scalable video encoding device, a multi-track video in a plurality of layers according to a set reference, (b) extracting, by the encoding device, encoding information, including an encoding mode and prediction information, by analyzing the bit stream of each of the arrayed layers, and (c) determining, by the encoding device, an encoding mode using encoding information about a layer on which scalable video encoding is performed and an upper or lower layer of the layer on which scalable video encoding is performed and encoding the multi-track video in the determined encoding mode.

Furthermore, the scalable video encoding method may further include the step of generating, by the encoding device, the multi-track video by compressing videos in various formats or receiving, by the encoding device, the multi-track video prior to the step (a).

Furthermore, the step (a) may include the steps of (a-1) arraying the multi-track video in the plurality of layers such that a video having higher resolution is disposed in a higher level, (a-2) arraying the multi-track video in the plurality of layers such that a video having a higher frame rate is disposed in a higher level if two or more videos having the same resolution are present in the multi-track video arrayed according to the resolutions, and (a-3) arraying the multi-track video in the plurality of layers such that a video having a higher bit rate is disposed in a higher level if two or more videos having the same frame rate are present in the multi-track video arrayed according to the frame rates.

Furthermore, the step (c) may include the steps of (c-1) performing inter-layer intra prediction by up-scaling the encoding information about a macroblock of the layer on which scalable video encoding is performed and the encoding information about a macroblock of an upper layer corresponding to the macroblock, (c-2) calculating an encoding cost of an inter-layer intra mode and an encoding cost of an encoding mode of the layer on which scalable video encoding is performed, (c-3) determining the inter-layer intra mode or the encoding mode of the layer on which scalable video encoding is performed to be the encoding mode of the layer on which scalable video encoding is performed by comparing the calculated encoding costs with each other, and (c-4) encoding the macroblock of the layer on which scalable video encoding is performed in the determined encoding mode, wherein the steps (c-1) to (c-4) are repeated until the encoding of videos of the multi-track video from the lowest layer to the highest layer are sequentially completed.

Furthermore, in the step (c-3), the inter-layer intra mode may be determined to be the encoding mode of the layer on which scalable video encoding is performed if the calculated encoding cost of the inter-layer intra mode is smaller than the encoding cost of the encoding mode of the layer on which scalable video encoding is performed, and the encoding mode of the layer on which scalable video encoding is performed may be determined to be the encoding mode of the layer on which scalable video encoding is performed if the calculated encoding cost of the inter-layer intra mode is greater than or equal to the encoding cost of the encoding mode of the layer on which scalable video encoding is performed.

Furthermore, in the step (a), the set reference may be order of picture quality determined using an objective picture quality evaluation method, and the multi-track video may be arrayed in the plurality of layers such that a high-picture quality video is disposed in an upper layer according to the order of picture quality.

Furthermore, the step (c) may include the steps of (c-1) determining whether or not a macroblock of the layer on which scalable video encoding is performed is a motion prediction mode using motion vector information, (c-2) performing a step (c-3) if the macroblock is a motion prediction mode and encoding the macroblock in an intra mode if the macroblock is not a motion prediction mode, (c-3) determining whether or not a macroblock of the lower layer of the macroblock is a motion prediction mode, (c-4) performing a step (c-5) if the macroblock of the lower layer is a motion prediction mode and encoding the macroblock in an encoding mode of the macroblock if the macroblock of the lower layer is not a motion prediction mode, (c-5) comparing macroblock partition information about a macroblock of the lower layer that has been up-scaled with macroblock partition information about the macroblock, (c-6) performing a step (c-7) if the pieces of macroblock partition information are identical with each other and encoding the macroblock in the encoding mode of the macroblock if the pieces of macroblock partition information are not identical with each other, (c-7) comparing a motion vector of the macroblock of the up-scaled lower layer with a motion vector of the macroblock, and (c-8) encoding the macroblock in an inter-layer motion prediction mode if the motion vectors are identical with each other and encoding the macroblock in the encoding mode of the macroblock if the motion vectors are not identical with each other, wherein in the steps (c-2), (c-4), (c-6), and (c-8), when the encoding of the macroblock is completed, the steps subsequent to the step (c-1) are repeatedly performed on a next macroblock, and macroblocks from the highest layer to the lowest layer are sequentially encoded.

Advantageous Effects

As described above, the high-speed scalable video coding device and method using a multi-track video according to the present invention is advantageous in that the time taken for encoding into scalable videos can be reduced because encoding information about a multi-track video is used.

Furthermore, compression efficiency can be improved because an encoding mode is determined by comparing an encoding cost for an existing encoding mode of a multi-track video with an encoding cost for an inter-layer intra prediction mode.

Furthermore, a calculation time necessary for motion prediction can be reduced and the time taken for encoding into a scalable video can be reduced because an encoding mode is determined by comparing information about the prediction of an existing multi-track video with information about the prediction of a scalable video.

MODE FOR INVENTION

Figure 1:
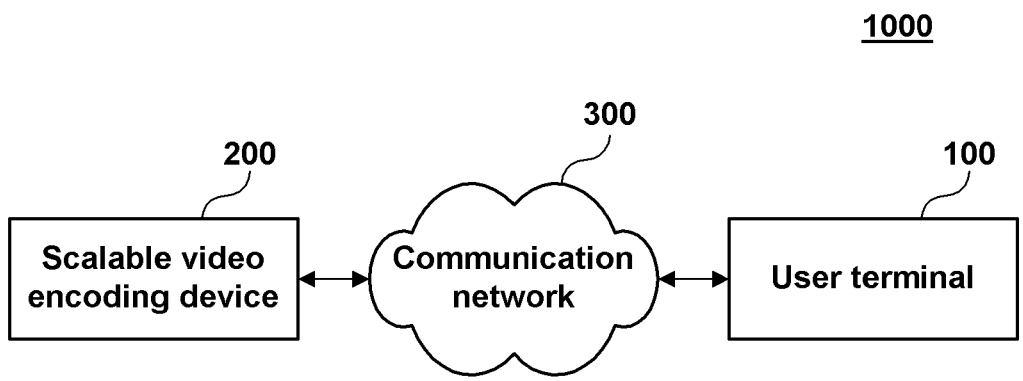
FIG. 1 is a construction diagram showing an embodiment of a scalable video providing system in accordance with an aspect of the present invention.

The present invention may be modified in various ways and may be implemented to have several embodiments. Specific embodiments are illustrated in the drawings and are described in detail. It is however to be noted that the present invention is not intended to be limited to the specific embodiments of the present invention, but it is to be understood that the specific embodiments include all modifications, equivalents to substitutions which fall within the spirit and technical scope of the present invention.

Embodiments of a high-speed scalable video coding device and method using a multi-track video according to the present invention are described in detail with reference to the accompanying drawings. In describing the embodiments with reference to the accompanying drawings, the same or corresponding elements are assigned the same reference numerals, and a redundant description thereof is omitted.

Scalable Video Providing System

FIG. 1 is a construction diagram showing an embodiment of a scalable video providing system in accordance with an aspect of the present invention.

The scalable video providing system 1000 of the present invention includes, as shown in FIG. 1, a user terminal 100, a scalable video encoding device 200, and a communication network 300.

The user terminal 100 can receive a scalable video and decode and display the scalable video depending on the specification of the user terminal, a network environment, or a service type.

The user terminal 100 means a video display device including IPTV, a settop box, a smart phone, and a mobile communication terminal supporting a DMB function, the specification of the user terminal means information about the resolution and size of a display screen, the network environment means a frame transfer rate, and the service type means the type of displayed video, such as HDTV, SDTV, or DMB.

The scalable video encoding device 200 performs a scalable video encoding function on a multi-track video. The communication network 300 provides a path along which a scalable video received from the scalable video encoding device 200 is transmitted to the user terminal 100 and includes a mobile communication network, such as WCDMA, HDPA, 3G, or 4G, a local communication network, such as Bluetooth, Zigbee, or Wi-Fi, a wired communication network, such as a PSTN, or wired and wireless Internet.

The scalable video encoding device 200 is described in detail with reference to FIGS. 2 to 5.

Scalable Video Encoding Device

Figure 2:
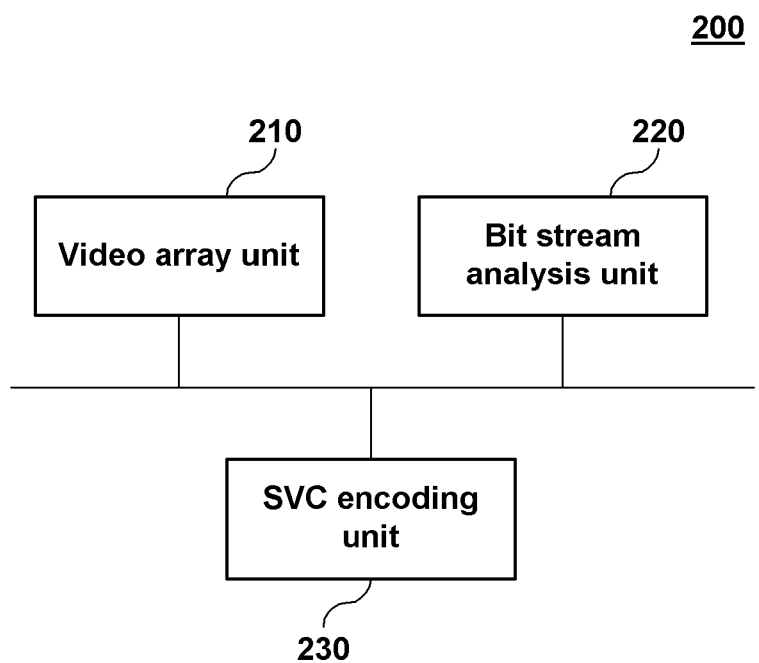
FIG. 2 is a construction diagram showing a first embodiment of a scalable video encoding device in accordance with another aspect of the present invention.
Figure 3:
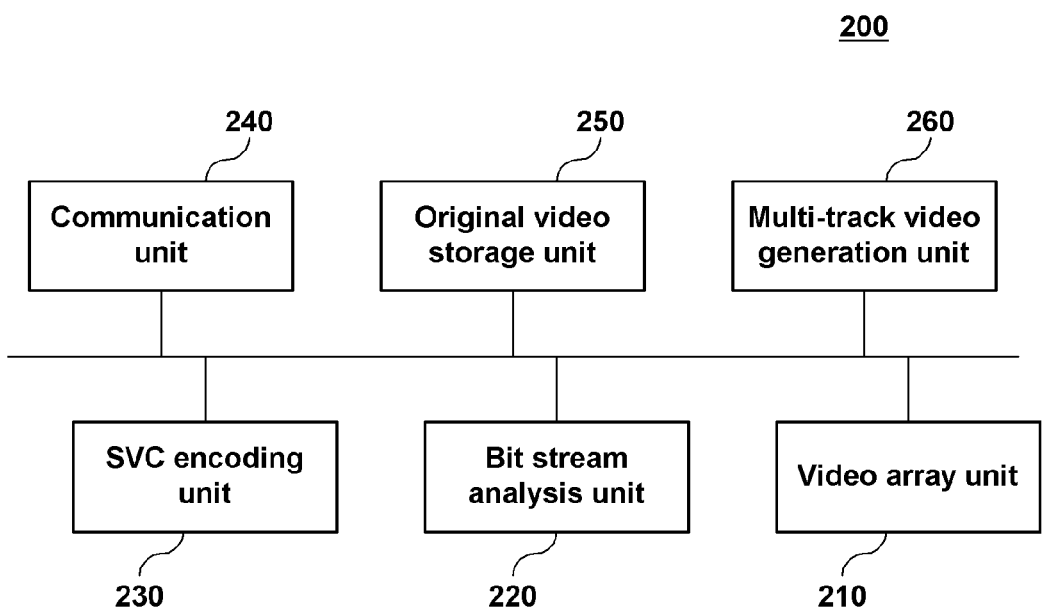
FIG. 3 is a construction diagram showing a second embodiment of the scalable video encoding device in accordance with another aspect of the present invention.
Figure 4:
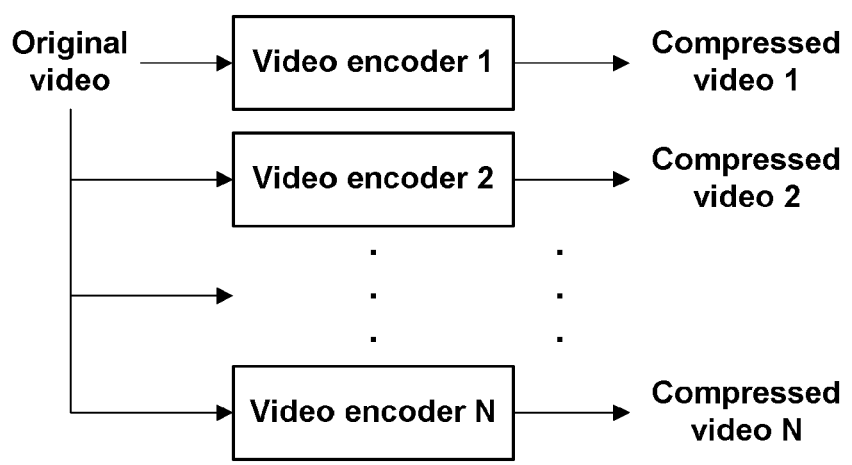
FIG. 4 is a diagram illustrating the function of a multi-track video generation unit that is an element of the scalable video encoding device in accordance with a second embodiment of the present invention.
Figure 5:
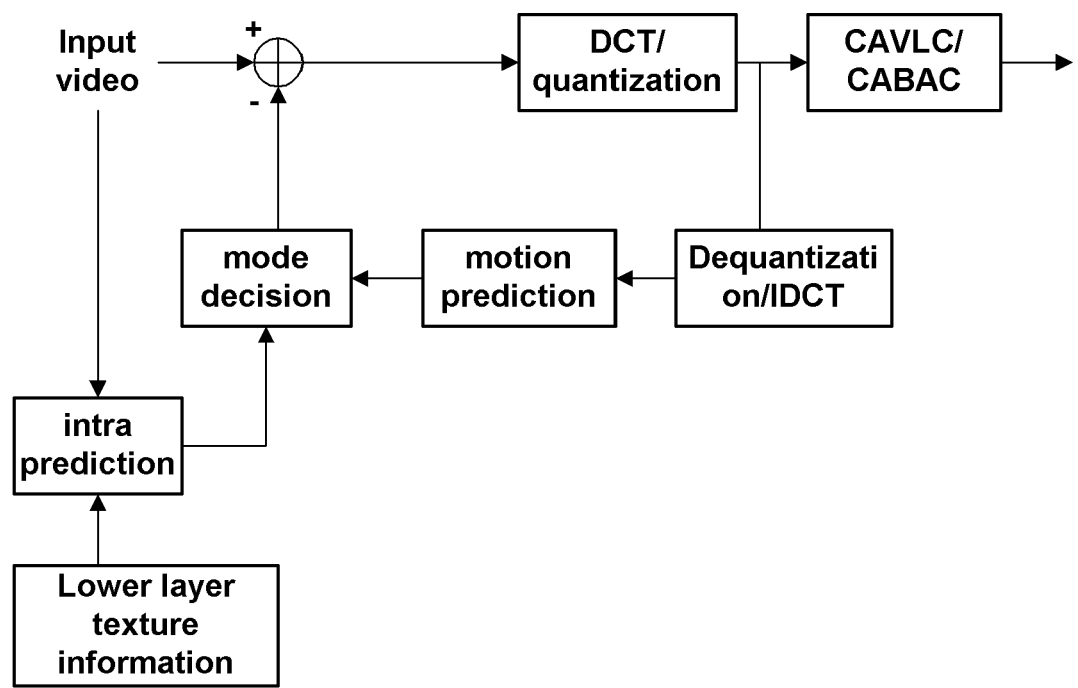
FIG. 5 is a diagram illustrating the function of an SVC encoding unit that is an element of the scalable video encoding device in accordance with the first or second embodiment of the present invention.

FIG. 2 is a construction diagram showing a first embodiment of the scalable video encoding device in accordance with another aspect of the present invention, FIG. 3 is a construction diagram showing a second embodiment of the scalable video encoding device in accordance with another aspect of the present invention, FIG. 4 is a diagram illustrating the function of a multi-track video generation unit that is an element of the scalable video encoding device in accordance with a second embodiment of the present invention, and FIG. 5 is a diagram illustrating the function of an SVC encoding unit that is an element of the scalable video encoding device in accordance with the first or second embodiment of the present invention.

The scalable video encoding device 200 performs a function for arraying a multi-track video in a plurality of layers according to a set reference, extracting encoding information about the plurality of arrayed layers, and encoding the multi-track video into a scalable video using the extracted encoding information.

The multi-track video means a plurality of compression videos having different formats, which have been compressed from the same video in various formats. The multi-track video means a video coded using various encoding methods (e.g., H.264) in order to provide compression videos having formats suitable for various devices and network environments.

The scalable video encoding device 200 is a device for encoding a multi-track video, that is, an existing encoded compression video, into a scalable video. The scalable video encoding device 200 can improve scalable video encoding speed using encoding information about a multi-track video when encoding the multi-track video into a scalable video.

Furthermore, the scalable video encoding device 200 determines an encoding mode based on a 'set reference' on which a multi-track video is arrayed and 'encoding information' used to determine the encoding mode and can reduce an encoding time by encoding the multi-track video based on the determined encoding mode.

Scalable Video Encoding Device According to First Embodiment

The scalable video encoding device 200 according to the first embodiment is configured to include a video array unit 210, a bit stream analysis unit 220, and an SVC encoding unit 230, as shown in FIG. 2.

The video array unit 210 of the scalable video encoding device arrays a multi-track video in a plurality of layers according to a set reference so that compression videos having different formats are arrayed in the plurality of layers.

A 'layer' used herein means a compression video.

The video array unit 210 can select any one of a first reference, including the resolution, frame rate, and bit rate of a compression video, and a second reference, that is, order of objectively evaluated picture quality, as a set reference on which the multi-track video is arrayed.

The bit stream analysis unit 220 extracts encoding information, including an encoding mode and prediction information, by analyzing the bit stream of each layer.

Here, the encoding mode means an intra mode or an inter mode, that is, a method of compressing a macroblock. The prediction information means information necessary for motion prediction, which include a motion vector and macroblock partition information.

That is, the bit stream analysis unit 220 performs a function for extracting encoding information that has been used when encoding a multi-track video.

The SVC encoding unit 230 determines an encoding mode using encoding information about an upper or lower layer of a layer on which scalable video encoding is now performed and a layer on which scalable video encoding is now performed (hereinafter called a 'layer to be now encoded') and performs encoding in the determined encoding mode.

The SVC encoding unit 230 determines an encoding mode of a layer to be now encoded or a macroblock using encoding information about two layers or a macroblock corresponding to the two layers.

Furthermore, the SVC encoding unit 230 can select one of first encoding information, including the encoding cost of an encoding mode, and second encoding information, including a motion vector and macroblock partition information, in order to determine an encoding mode.

If the video array unit 210 selects the first reference and arrays a multi-track video and the SVC encoding unit 230 selects the first encoding information and determines an encoding mode, the scalable video encoding device 200 encodes a multi-track video according to the following order.

The video array unit 210 arrays a multi-track video in a plurality of layers according to the first reference, that is, resolutions, frame rates, and bit rates.

More particularly, the video array unit 210 arrays a multi-track video in a plurality of layers such that a video having higher resolution is disposed in a higher level, arrays a multi-track video in a plurality of layers such that a video having a higher frame rate is disposed in a higher level if two or more videos having the same resolution are present, and arrays a multi-track video in a plurality of layers such that a video having a higher bit rate is disposed in a higher level if two or more videos having the same resolution and frame rate are present.

The bit stream analysis unit 220 extracts encoding information by analyzing the bit stream of each layer and sequentially provides the SVC encoding unit 230 with encoding information about the lowest layer or the highest layer.

The SVC encoding unit 230 encodes each of a plurality of layers of a multi-track video by the macroblock and sequentially performs scalable video encoding from the lowest layer to the highest layer of the plurality of layers or from the highest layer to the lowest layer of the plurality of layers.

When sequentially performing scalable video encoding from the lowest layer, the scalable video encoding is performed using the bit stream of the lowest layer as a base layer, and neighboring upper layers are then sequentially subject to scalable video encoding.

More particularly, the SVC encoding unit 230 performs inter-layer intra prediction by up-scaling the macroblock of a layer to be now encoded and decoded texture information about each of upper layer macroblocks corresponding to the macroblock.

The SVC encoding unit 230 calculates the encoding cost of an encoding mode of a layer to be now encoded, calculates the encoding cost of an inter-layer intra mode through inter-layer intra prediction, and uses the calculated encoding costs as the first encoding information.

The SVC encoding unit 230 compares the calculated encoding costs with each other, determines the inter-layer intra mode to be the encoding mode if the encoding cost of the inter-layer intra mode is smaller than the encoding cost of the encoding mode of the layer to be now encoded, and determines the encoding mode of the layer to be now encoded to be the encoding mode if the encoding cost of the inter-layer intra mode is equal to or greater than the encoding cost of the encoding mode of the layer to be now encoded.

Finally, the SVC encoding unit 230 performs scalable video encoding on a multi-trap video in the determined encoding mode.

If the video array unit 210 selects the second reference and arrays a multi-track video and the SVC encoding unit 230 selects the second encoding information and determines an encoding mode, the scalable video encoding device 200 encodes the multi-track video according to the following order.

First, the video array unit 210 selects the second reference as a set reference and arrays a multi-track video in a plurality of layers such that a high-picture quality video is disposed in an upper layer in order of picture quality that has been determined using an objective picture quality evaluation method.

The objective picture quality evaluation method can be classified into a full reference method for comparing a compressed image with the original image, a reduced reference method for extracting only major information from the original image and evaluating the extracted information, and a non-reference method for evaluating picture quality without the original image. In evaluating picture quality of a compression video, if the compression video has the same capacity, a compression capacity to a Peak Signal to Noise Ratio (PSNR) on which how much is a loss reduced from the original image or how much is capacity reduced in the same loss can be used as an evaluation criterion.

Next, the bit stream analysis unit 220 extracts prediction information, including macroblock partition information and motion vector information, as the second encoding information through video bit stream decoding for neighboring layers of a plurality of layers and provides the SVC encoding unit 230 with the extracted prediction information based on prediction information about the highest layer and layers neighboring the highest layer.

The SVC encoding unit 230 determines one of an inter-layer motion prediction mode, an intra mode, and an encoding mode of a layer on which scalable video encoding is performed to be an encoding mode for a macroblock using the macroblock partition information and the motion vector information and encodes each layer of the multi-track video by the macroblock.

Here, the SVC encoding unit 230 can sequentially determine a first process of determining whether or not the macroblock of the layer to be now encoded is a motion prediction mode, a second process of determining whether or not the macroblock of a lower layer of the macroblock is a motion prediction mode, a third process of determining whether or not macroblock partition information about the macroblock of the lower layer that has been up-scaled is identical with macroblock partition information about the macroblock, and a fourth process of determining whether or not a motion vector of the macroblock of the lower layer is identical with a motion vector of the macroblock based on the motion vector information, determine the inter-layer motion prediction mode, the intra mode, or the encoding mode of a layer on which scalable video encoding to be an encoding mode for the macroblock based on a result of the determination, and encode the macroblock in the determined encoding mode.

More particularly, the SVC encoding unit 230 encodes the macroblock of the layer to be now encoded in the intra mode if the macroblock of the layer to be now encoded does not correspond to a motion prediction mode in the first process and performs the second process if the macroblock of the layer to be now encoded is the motion prediction mode.

The SVC encoding unit 230 encodes the macroblock to be now encoded in its own encoding mode if the macroblock of the lower layer does not correspond to the motion prediction mode in the second process and performs the third process if the macroblock of the lower layer is the motion prediction mode.

The SVC encoding unit 230 encodes the macroblock to be now encoded in its own encoding mode if the macroblock partition information about the macroblock of the lower layer is not identical with the macroblock partition information about the macroblock in the third process and performs the fourth process if the macroblock partition information about the macroblock of the lower layer is identical with the macroblock partition information about the macroblock.

The SVC encoding unit 230 encodes the macroblock to be now encoded in its own encoding mode if a motion vector of the macroblock of the lower layer is not identical with a motion vector of the macroblock in the fourth process and encodes the macroblock to be now encoded in the inter-layer motion prediction mode if a motion vector of the macroblock of the lower layer is identical with a motion vector of the macroblock.

When a video (i.e., one layer of a multi-track video) is received as shown in FIG. 5, the SVC encoding unit 230 determines an encoding mode by performing intra prediction using texture information about the received layer and a layer under the received layer or determines an encoding mode through motion prediction for the received layer and the lower layer.

The SVC encoding unit 260 performs Discrete Cosine Transform (DCT)/quantization processes and Context-Adaptive Variable-Length Coding (CAVLC)/Context-Adaptive Binary Arithmetic Coding (CABAC) processes on an SVC video in the determined operation mode.

That is, when performing encoding in the intra prediction mode based on texture information about a lower layer and performing encoding in the motion prediction mode based on motion information about the lower layer through the SVC encoding unit 230, if macroblock partition information about the macroblock of the lower layer is identical with macroblock partition information about a macroblock to be encoded as a result of a comparison, the scalable video encoding device 200 compares a motion vector of the macroblock of the lower layer with a motion vector of the macroblock to be encoded. The scalable video encoding device 200 performs encoding in the inter-layer motion prediction mode if a motion vector of the macroblock to be encoded is identical with a motion vector of the macroblock of the lower layer and performs encoding in the encoding mode of the macroblock to be now encoded if the macroblock partition information is not the same or the motion vector is not the same.

Scalable Video Encoding Device According to Second Embodiment

The scalable video encoding device according to the second embodiment is configured to include a video array unit 210, a bit stream analysis unit 220, an SVC encoding unit 230, a communication unit 240, an original video storage unit 250, and a multi-track video generation unit 260, as shown in FIG. 3.

Here, the video array unit 210, the bit stream analysis unit 220, and the SVC encoding unit 230 are the same as those of the scalable video encoding device 200 according to the first embodiment, and thus only the communication unit 240, the original video storage unit 250, and the multi-track video generation unit 260 different from the scalable video encoding device 200 according to the first embodiment are described.

The communication unit 240 is an element for accessing a user terminal over a communication network. The communication unit 240 forms a channel through which control signals and scalable videos are transported, and the original video storage unit 250 stores the original video that has not been encoded.

The multi-track video generation unit 260 receives the original video from the original video storage unit 250 and generates a multi-track video, as shown in FIG. 4.

A plurality of video encoders 1 to N generates compression videos having different formats using the original video, and the generated compression videos having different formats mean a multi-track video.

That is, the scalable video encoding device 200 according to the second embodiment is different from the scalable video encoding device according to the first embodiment in that it further performs a function for generating a multi-track video by encoding the original video in various formats.

Scalable Video Encoding Method

Figure 6:
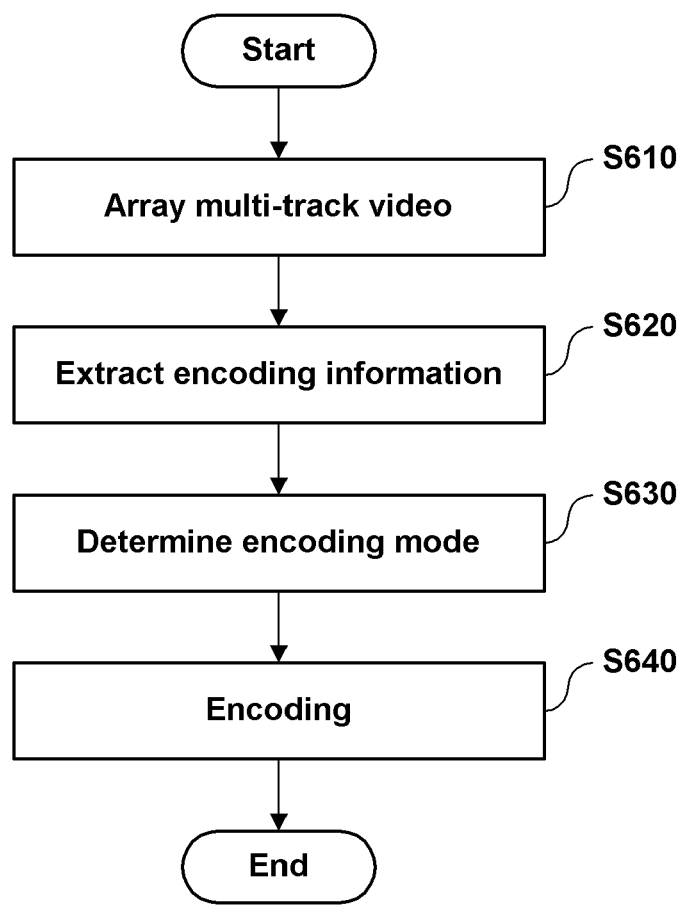
FIG. 6 is a flowchart illustrating a scalable video encoding method in accordance with another aspect of the present invention.

FIG. 6 is a flowchart illustrating a scalable video encoding method in accordance with another aspect of the present invention, and FIGS. 7 to 10 are flowcharts illustrating a first embodiment to a fourth embodiment of the scalable video encoding method in accordance with another aspect of the present invention.

The scalable video encoding method in accordance with another aspect of the present invention includes arraying, by the scalable video encoding device, a multi-track video in a plurality of layers according to a set reference (S610) and extracting encoding information including an encoding mode and prediction information by analyzing the bit streams of the arrayed layers (S620), as shown in FIG. 6.

Next, the scalable video encoding method includes determining an encoding mode using encoding information about a layer on which scalable video encoding is performed and encoding information about an upper or lower layer (S630) and encoding the multi-track video in the determined encoding mode (S640).

Accordingly, in the scalable video encoding method, a multi-track video can be encoded into scalable videos at high speed because an encoding mode on which the multi-track video will be encoded is determined using encoding information about an existing multi-track video and the multi-track video.

Scalable Video Encoding Method According to First Embodiment

Figure 7:
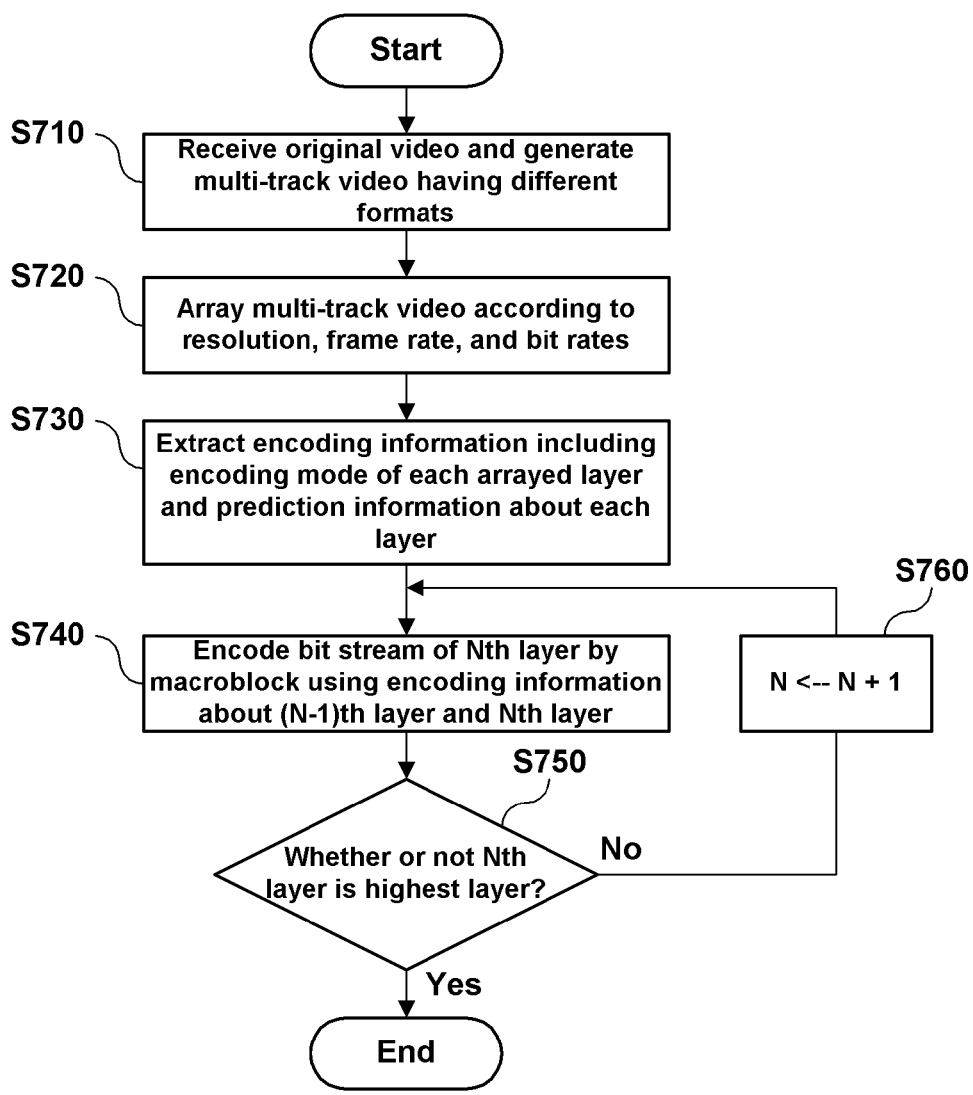
FIG. 7 is a flowchart illustrating a first embodiment of a scalable video encoding method in accordance with another aspect of the present invention.

The scalable video encoding method according to the first embodiment is a case where the first reference and the first encoding information are selected and encoding is performed. As shown in FIG. 7, the scalable video encoding method for a multi-track video is performed according to processes S710 to S760.

First, the original video is received, and a multi-track video having different formats is generated using the original video (S710). The multi-track video is arrayed according to their resolutions, frame rates, and bit rates (S720).

In the generation of the multi-track video (S710), the scalable video encoding device can generate the multi-track video by compressing the original video in various formats.

The array of the multi-track video (S720) can be performed by arraying the multi-track video such that a video having higher resolution is disposed in an upper layer, arraying the multi-track video again such that a video having a higher frame rate is disposed in an upper layer if two or more videos having the same resolution are present in the multi-track video arrayed according to resolutions, and arraying the multi-track video again such that a video having a higher bit rate is disposed in an upper layer if two or more videos having the same frame rate are present in the multi-track video arrayed again according to the frame rates.

Next, encoding information, including an encoding mode of each of the arrayed layers and prediction information about each layer, is extracted (S730), and encoding information about an $(N-1)^{th}$ layer to be now encoded and information the encoding of an $N^{th}$ layer that is an upper layer are transferred to the SVC encoding unit.

The SVC encoding unit encodes the bit stream of the $N^{th}$ layer by the macroblock using the encoding information about the $(N-1)^{th}$ layer and the encoding information about the $N^{th}$ layer (S740) and determines whether or not the $N^{th}$ layer is the highest layer (S750). The SVC encoding unit terminates the encoding if encoding has been performed up to the highest layer and performs scalable video encoding from the lowest layer to the highest layer by repeating the processes S740 to S750 by substituting N<-(N+1) if the $N^{th}$ layer is not the highest layer.

Scalable Video Encoding Method According to Second Embodiment

Figure 8:
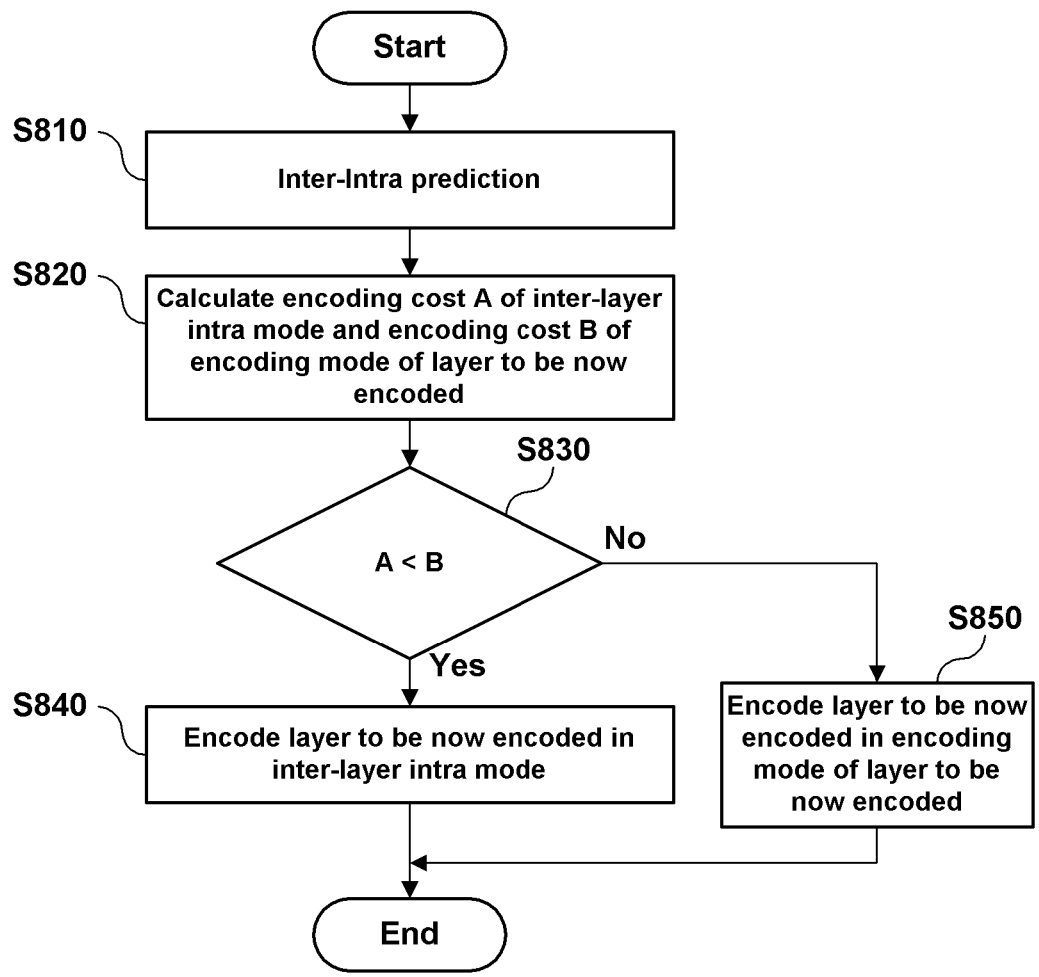
FIG. 8 is a flowchart illustrating a second embodiment of a scalable video encoding method in accordance with another aspect of the present invention.

The scalable video encoding method according to the second embodiment is detailed processes of the processes S740 to S760 of FIG. 7 if the first reference and the first encoding information are selected and encoding is performed, and the scalable video encoding method is shown in FIG. 8.

The scalable video encoding method according to the second embodiment includes arraying a multi-track video according to the first reference (resolution, a frame rate, and a bit rate) and extracting encoding information about each layer.

Furthermore, inter-layer intra prediction is performed by up-scaling encoding information about the macroblock of a layer on which video encoding is performed and encoding information about a macroblock in the upper layer of the macroblock on which video encoding is performed (S810).

Next, the encoding cost A of an inter-layer intra mode and the encoding cost B of an encoding mode of the layer on which scalable video encoding is performed are calculated (S820), and the calculated encoding costs are compared with each other (S830).

If, as a result of the comparison, A is found to be smaller than B, the inter-layer intra mode is determined to be an encoding mode, and the layer to be now encoded is encoded (S840). If A is not smaller than B, the layer to be now encoded is encoded in the encoding mode of the layer to be now encoded (S850).

The processes S810 to S850 can be repeated until encoding for the videos of the multi-track video from the lowest layer to the highest layer are sequentially completed.

Scalable Video Encoding Method According to Third Embodiment

The scalable video encoding method according to the third embodiment is a case where the second reference and the second encoding information are selected and encoding is performed. The scalable video encoding method for a multi-track video is performed according to processes S910 to S970, as shown in FIG. 8.

The scalable video encoding method according to the third embodiment includes receiving the original video, generating a multi-track video having different formats (S910), and arraying the multi-track video in order of picture quality (S920).

The array of the multi-track video can be determined in order of picture quality determined using an objective picture quality evaluation method, and the multi-track video can be arrayed in a plurality of layers such that high-picture quality videos are arrayed in an upper layer in order of picture quality.

Next, the scalable video encoding method extracts prediction information, including an encoding mode, macroblock partition information, and motion vector information for each of the arrayed layers, as encoding information (S930).

An encoding mode of the macroblock of an $N^{th}$ layer is determined using macroblock partition information and motion information about the $N^{th}$ layer, that is, a layer to be now encoded, and an $(N-1)^{th}$ layer, that is, a lower layer, (S940). Encoding is performed in the determined encoding mode (S950).

When the encoding of the $N^{th}$ layer is completed, it is determined whether or not the $(N-1)^{th}$ layer is the lowest layer (S960). If it is determined that the $(N-1)^{th}$ layer is not the lowest layer, N<-(N-1) is substituted (S970) and the processes S940 to S970 are repeated. If it is determined that the $(N-1)^{th}$ layer is the lowest layer, the processes S940 to S970 are terminated, and the lowest layer is encoded.

Scalable Video Encoding Method According to Fourth Embodiment

Figure 9:
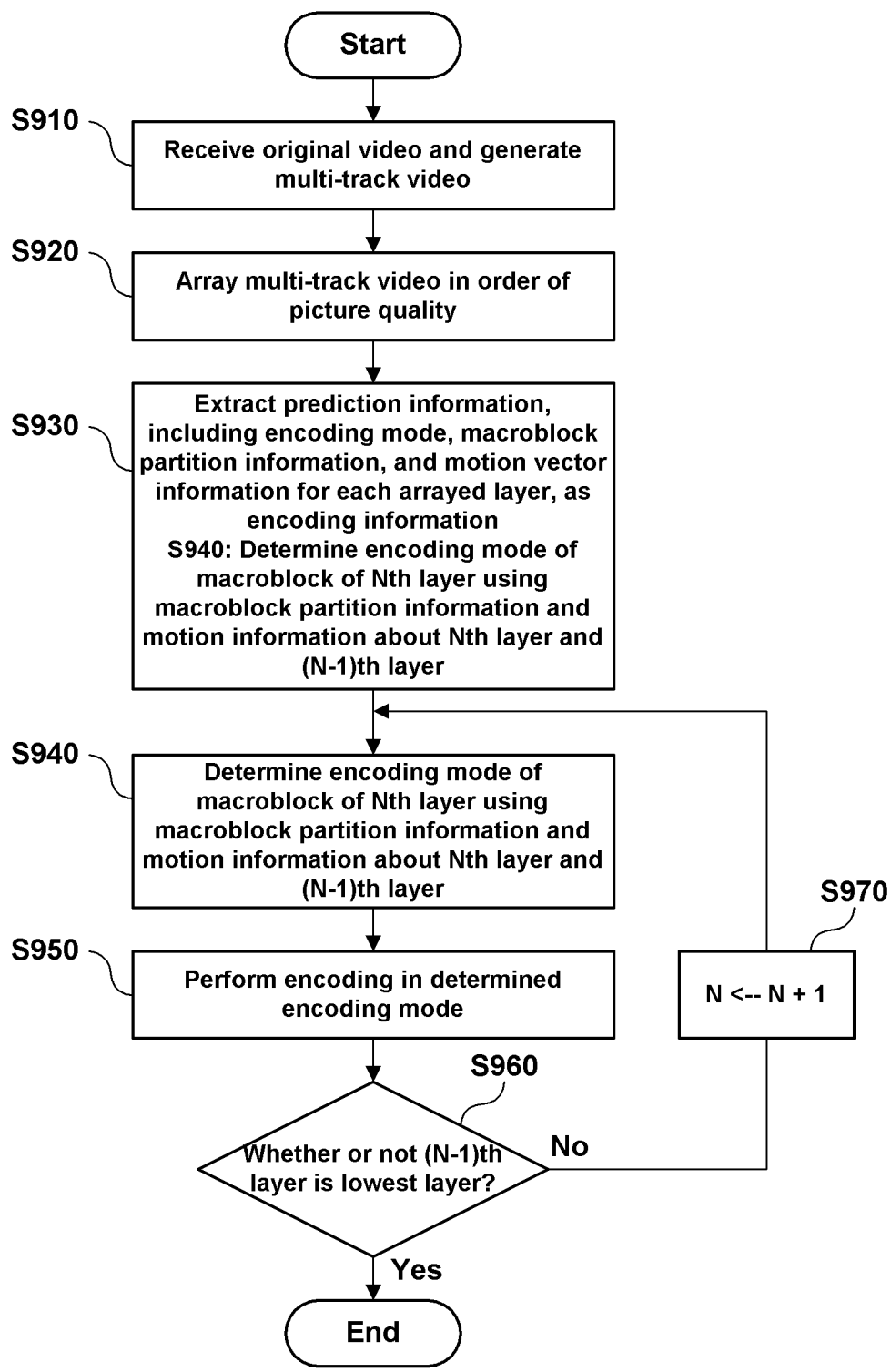
FIG. 9 is a flowchart illustrating a third embodiment of a scalable video encoding method in accordance with another aspect of the present invention.
Figure 10:
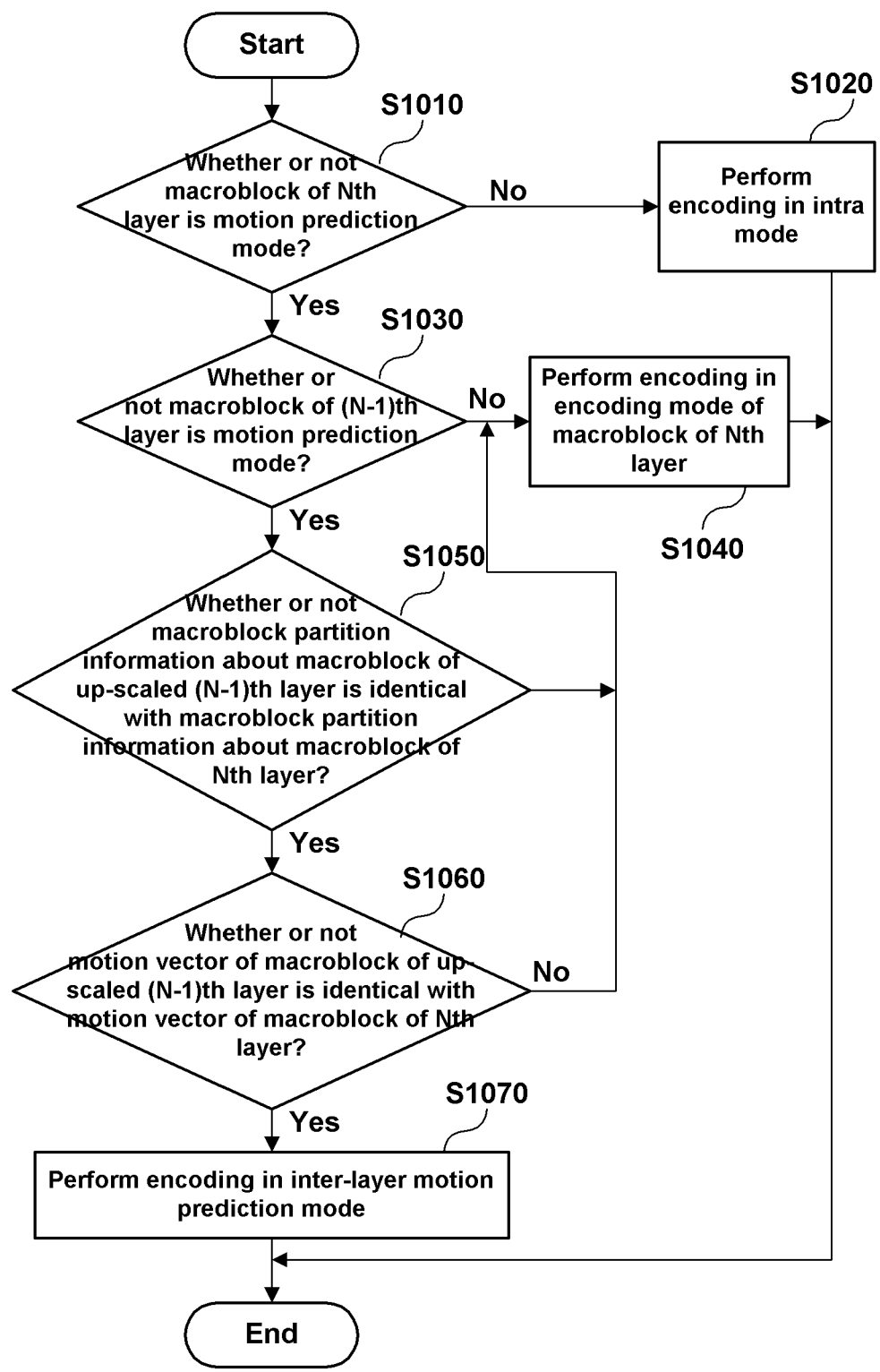
FIG. 10 is a flowchart illustrating a fourth embodiment of a scalable video encoding method in accordance with another aspect of the present invention.

The scalable video encoding method according to the fourth embodiment correspond to detailed processes of the processes S940 to S970 of FIG. 9 if the second reference and the second encoding information are selected and encoding is performed, and the scalable video encoding method is shown in FIG. 10.

The scalable video encoding method according to the fourth embodiment includes determining whether or not the macroblock of an $N^{th}$ layer, that is, a layer to be now encoded, is a motion prediction mode using motion vector information (S1010). If it is determined that the macroblock of the $N^{th}$ layer is not a motion prediction mode, the macroblock of the $N^{th}$ layer is encoded in an intra mode (S1020). If it is determined that the macroblock of the $N^{th}$ layer is a motion prediction mode, whether or not the macroblock of an $(N-1)^{th}$ layer is a motion prediction mode is determined (S1030).

If, as a result of the determination, it is determined that the macroblock of the $(N-1)^{th}$ layer is not a motion prediction mode, the macroblock of the $N^{th}$ layer is encoded in the encoding mode of the macroblock of the $N^{th}$ layer (S1040). If, as a result of the determination, it is determined that the macroblock of the $(N-1)^{th}$ layer is a motion prediction mode, macroblock partition information about the macroblock of an up-scaled $(N-1)^{th}$ layer is compared with macroblock partition information about the macroblock of the $N^{th}$ layer (S1050).

If, as a result of the comparison, the macroblock partition information about the macroblock of the up-scaled $(N-1)^{th}$ layer is found not to be identical with the macroblock partition information about the macroblock of the $N^{th}$ layer, the macroblock of the $N^{th}$ layer is encoded in the encoding mode of the macroblock of the $N^{th}$ layer (S1040). If, as a result of the comparison, the macroblock partition information about the macroblock of the up-scaled $(N-1)^{th}$ layer is found to be identical with the macroblock partition information about the macroblock of the $N^{th}$ layer, a motion vector of the macroblock of the $(N-1)^{th}$ layer that has been up-scaled is compared with a motion vector of the macroblock of the $N^{th}$ layer (S1060).

If, as a result of the comparison, a motion vector of the macroblock of the up-scaled $(N-1)^{th}$ layer is found to be identical with a motion vector of the macroblock of the $N^{th}$ layer, the macroblock of the $N^{th}$ layer is encoded in an inter-layer motion prediction mode (S1070). If, as a result of the comparison, a motion vector of the macroblock of the up-scaled $(N-1)^{th}$ layer is found not to be identical with a motion vector of the macroblock of the $N^{th}$ layer, the macroblock of the $N^{th}$ layer is encoded in the encoding mode of the $N^{th}$ layer macroblock (S1040).

When the encoding of the macroblock of the $N^{th}$ layer is completed, the processes S1010 to S1070 are repeatedly performed on a next macroblock, and macroblocks from the highest layer to the lowest layer are sequentially encoded.

As described above, in accordance with the present invention, when encoding a multi-track video, encoded from the original video in various formats, into a scalable video, an encoding mode is determined at high speed using encoding information about an existing multi-track video. Accordingly, encoding speed can be improved.

In particular, an encoding mode of a multi-track video can be extracted from encoding information about an existing multi-track video at high speed, and a motion prediction time having the highest computational load upon encoding can be speeded up. Accordingly, conversion speed into a scalable video can be improved.

INDUSTRIAL APPLICABILITY

The present invention can be applied to an encoder for encoding a scalable video, a device including the encoder, and a system for sending content using the same.

Furthermore, the present invention can be applied to a content server for serving content including video and audio over a communication network or a content media communication system including a user terminal for receiving and displaying content.

The invention claimed is:
1. A scalable video encoding device, comprising:
a video array unit for arraying a multi-track video in a plurality of layers according to a set reference;
a bit stream analysis unit for extracting encoding information, comprising an encoding mode and prediction information, by analyzing a bit stream of each of the layers; and
an SVC encoding unit for determining an encoding mode using encoding information about a layer on which scalable video encoding is performed and an upper or lower layer of the layer on which scalable video encoding is performed and performing encoding in the determined encoding mode,
wherein the video array unit arrays the multi-track video in the plurality of layers such that a video having higher resolution is disposed in a higher level, arrays the multi-track video in the plurality of layers such that a video having a higher frame rate is disposed in a higher level if two or more videos having identical resolution are present, and arrays the multi-track video in the plurality of layers such that a video having a higher bit rate is disposed in a higher level if two or more videos having identical resolution and frame rate are present.

2. The scalable video encoding device of claim 1, wherein the SVC encoding unit encodes each layer of the multi-track video by a macroblock and sequentially performs scalable video encoding on the plurality of layers from a lowest layer to a highest layer or from a highest layer to a lowest layer.

3. The scalable video encoding device of claim 1, wherein the SVC encoding unit performs inter-layer intra prediction by up-scaling decoded texture information about a macroblock of the layer on which scalable video encoding is performed and decoded texture information about a macroblock of an upper layer corresponding to the macroblock, calculates an encoding cost of an inter-layer intra mode, calculates an encoding cost of an encoding mode of the layer on which scalable video encoding is performed, compares the calculated encoding costs with each other, performs encoding in the inter-layer intra mode if the encoding cost of the inter-layer intra mode is smaller than the encoding cost of the encoding mode of the layer on which scalable video encoding is performed, and performs encoding in the encoding mode of the layer on which scalable video encoding is performed if the encoding cost of the inter-layer intra mode is greater than or equal to the encoding cost of the encoding mode of the layer on which scalable video encoding is performed.

4. The scalable video encoding device of claim 1, wherein:
the set reference is order of picture quality determined using an objective picture quality evaluation method, and
the video array unit arrays the multi-track video in the plurality of layers such that a high-picture quality video is disposed in an upper layer according to the order of picture quality.

5. The scalable video encoding device of claim 1, wherein the bit stream analysis unit extracts the prediction information, comprising macroblock partition information and motion vector information, through video bit stream decoding for neighboring layers of the plurality of layers.

6. The scalable video encoding device of claim 1, wherein the SVC encoding unit encodes each layer of the multi-track video by a macroblock and encodes the macroblock in an inter-layer motion prediction mode, an intra mode, or an encoding mode of the layer on which scalable video encoding is performed using macroblock partition information and motion vector information.

7. The scalable video encoding device of claim 6, wherein the SVC encoding unit determines the inter-layer motion prediction mode, the intra mode, or the encoding mode of the layer on which scalable video encoding is performed to be an encoding mode of the macroblock by sequentially determining a first process of determining whether or not the macroblock of the layer on which scalable video encoding is performed is a motion prediction mode, a second process of determining whether or not a macroblock of a lower layer of the macroblock is a motion prediction mode, a third process of determining whether or not macroblock partition information about a macroblock of the lower layer that has been up-scaled is identical with macroblock partition information about the macroblock, and a fourth process of determining whether or not a motion vector of the macroblock of the lower layer is identical with a motion vector of the macroblock.

8. A scalable video encoding method, comprising steps of:
(a) arraying, by a scalable video encoding device, a multi-track video in a plurality of layers according to a set reference;
(b) extracting, by the encoding device, encoding information, comprising an encoding mode and prediction information, by analyzing a bit stream of each of the arrayed layers; and
(c) determining, by the encoding device, an encoding mode using encoding information about a layer on which scalable video encoding is performed and an upper or lower layer of the layer on which scalable video encoding is performed and encoding the multi-track video in the determined encoding mode,
wherein the step (a) comprises steps of:
(a-1) arraying the multi-track video in the plurality of layers such that a video having higher resolution is disposed in a higher level;
(a-2) arraying the multi-track video in the plurality of layers such that a video having a higher frame rate is disposed in a higher level if two or more videos having identical resolution are present in the multi-track video arrayed according to the resolutions; and
(a-3) arraying the multi-track video in the plurality of layers such that a video having a higher bit rate is disposed in a higher level if two or more videos having an identical frame rate are present in the multi-track video arrayed according to the frame rates.

9. The scalable video encoding method of claim 8, further comprising a step of generating, by the encoding device, the multi-track video by compressing videos in various formats or receiving, by the encoding device, the multi-track video prior to the step (a).

10. The scalable video encoding method of claim 8, wherein the step (c) comprises steps of:
(c-1) performing inter-layer intra prediction by up-scaling the encoding information about a macroblock of the layer on which scalable video encoding is performed and the encoding information about a macroblock of an upper layer corresponding to the macroblock;
(c-2) calculating an encoding cost of an inter-layer intra mode and an encoding cost of an encoding mode of the layer on which scalable video encoding is performed;
(c-3) determining the inter-layer intra mode or the encoding mode of the layer on which scalable video encoding is performed to be the encoding mode of the layer on which scalable video encoding is performed by comparing the calculated encoding costs with each other; and
(c-4) encoding the macroblock of the layer on which scalable video encoding is performed in the determined encoding mode,
wherein the steps (c-1) to (c-4) are repeated until the encoding of videos of the multi-track video from a lowest layer to a highest layer are sequentially completed.

11. The scalable video encoding method of claim 10, wherein in the step (c-3), the inter-layer intra mode is determined to be the encoding mode of the layer on which scalable video encoding is performed if the calculated encoding cost of the inter-layer intra mode is smaller than the encoding cost of the encoding mode of the layer on which scalable video encoding is performed, and the encoding mode of the layer on which scalable video encoding is performed is determined to be the encoding mode of the layer on which scalable video encoding is performed if the calculated encoding cost of the inter-layer intra mode is greater than or equal to the encoding cost of the encoding mode of the layer on which scalable video encoding is performed.

12. The scalable video encoding method of claim 8, wherein in the step (a), the set reference is order of picture quality determined using an objective picture quality evaluation method, and the multi-track video is arrayed in the plurality of layers such that a high-picture quality video is disposed in an upper layer according to the order of picture quality.

13. The scalable video encoding method of claim 8, wherein the step (c) comprises steps of:
(c-1) determining whether or not a macroblock of the layer on which scalable video encoding is performed is a motion prediction mode using motion vector information;
(c-2) performing a step (c-3) if the macroblock is a motion prediction mode and encoding the macroblock in an intra mode if the macroblock is not a motion prediction mode;
(c-3) determining whether or not a macroblock of the lower layer of the macroblock is a motion prediction mode;
(c-4) performing a step (c-5) if the macroblock of the lower layer is a motion prediction mode and encoding the macroblock in an encoding mode of the macroblock if the macroblock of the lower layer is not a motion prediction mode;
(c-5) comparing macroblock partition information about a macroblock of the lower layer that has been up-scaled with macroblock partition information about the macroblock;
(c-6) performing a step (c-7) if the pieces of macroblock partition information are identical with each other and encoding the macroblock in the encoding mode of the macroblock if the pieces of macroblock partition information are not identical with each other;
(c-7) comparing a motion vector of the macroblock of the up-scaled lower layer with a motion vector of the macroblock; and
(c-8) encoding the macroblock in an inter-layer motion prediction mode if the motion vectors are identical with each other and encoding the macroblock in the encoding mode of the macroblock if the motion vectors are not identical with each other,
wherein in the steps (c-2), (c-4), (c-6), and (c-8), when the encoding of the macroblock is completed, the steps subsequent to the step (c-1) are repeatedly performed on a next macroblock, and macroblocks from a highest layer to a lowest layer are sequentially encoded.

* * * * *